United States Patent
Heyden (10) Patent No.: US 7,203,337 B2
(45) Date of Patent: Apr. 10, 2007

(54) ADJUSTED FILTERS

(75) Inventor: Anders Heyden, Dalby (SE)

(73) Assignee: Wespot AB, Lund (SE)

( * ) Notice: Subject to any disclaimer, the term of this patent is extended or adjusted under 35 U.S.C. 154(b) by 1033 days.

(21) Appl. No.: 10/174,024

(22) Filed: Jun. 18, 2002

(65) Prior Publication Data

US 2003/0053660 A1    Mar. 20, 2003

Related U.S. Application Data

(60) Provisional application No. 60/301,946, filed on Jun. 29, 2001.

(30) Foreign Application Priority Data

Jun. 21, 2001 (SE) .................................. 0102209

(51) Int. Cl.
G06K 9/00 (2006.01)
G06K 9/40 (2006.01)
H04N 7/18 (2006.01)
H04N 9/47 (2006.01)

(52) U.S. Cl. ...................... 382/103; 382/260; 382/169; 348/143; 348/131; 348/154; 348/161

(58) Field of Classification Search ................ 382/103, 382/169, 260–265; 348/143, 147, 131, 154, 348/155, 152, 234, 207.1, 208.12, 216.1
See application file for complete search history.

(56) References Cited

U.S. PATENT DOCUMENTS 5,351,314 A * 9/1994 Vaezi .......................... 382/264
5,561,718 A    10/1996 Trew et al.
5,719,959 A    2/1998 Krtolica
5,767,922 A    6/1998 Zabih et al.
5,937,091 A    8/1999 Wootton et al.
5,937,092 A *  8/1999 Wootton et al. ............ 382/192
5,956,424 A    9/1999 Wootton et al.
6,345,105 B1 * 2/2002 Nitta et al. .................. 382/100

FOREIGN PATENT DOCUMENTS

| DE | 19623524 | 1/1998 |
| EP | 0720114 | 7/1996 |
| EP | 0932115 | 7/1999 |
| WO | WO 0148696 | 7/2001 |

* cited by examiner

Primary Examiner—Bhavesh M. Mehta
Assistant Examiner—Wes Tucker

(57) ABSTRACT

A method in image processing for detection of a change in the scene in an area. The method comprises the steps of recording a digital image of the area using a sensor and transforming the recorded image by an operator. The operator is based on a previous modeling of changes in the lighting in the area and on a modeling of how the sensor depicts the area in grayscale values in the recorded image. The method further comprises the step of comparing the transformed image with a reference image of the area in order to detect a difference that indicates a change in the scene.

14 Claims, 7 Drawing Sheets

*Prior-art*

ADJUSTED FILTERS

CROSS-REFERENCE TO RELATED APPLICATION

This application is related to, and claims the benefit of, a previously filed U.S. Provisional patent application, titled "Adjusted Filters," application No. 60/301,946, filed Jun. 29, 2001.

FIELD OF THE INVENTION

The present invention relates to a method in image processing for detection of a change in the scene in an area. It also relates to a computer program, a monitoring system and use of an operator.

BACKGROUND

Image processing is used today to detect various types of object within a large number of applications, such as in monitoring to detect whether there is an object, such as a person, inside a monitored area. A sensor records images of the monitored area.

There are strong requirements for reliable results from the image processing of these images, as incorrect evaluations can be costly. For example, the image processing can be used in a monitoring system to prevent break-ins. If an intruder is falsely detected, resulting in a false alarm, it can be very costly if, for example, the police or other security personnel are informed and come to the site as a result of the false alarm.

In order to detect whether there is a foreign object within a monitored area, a sensor records the incident intensity as grayscale values in a digital image of the monitored area. The recorded image is then compared with a reference image. The reference image can, for example, be the immediately preceding image or an image taken at a time when there was no foreign object within the area.

If there is a difference between the compared images, this can be due to a change in the scene or to a change in the lighting of the scene. The monitored area can be said to be a scene that consists of a number of surfaces with reflectance properties. A change in the scene results in a change of the set of surfaces of the recorded image, for example by an object coming into the monitored area or moving in the monitored area, between when the reference image was recorded and when the current image was recorded. A change in the lighting means that the incident light in the scene is changed while the set of surfaces is unchanged, for example by the sun going behind a cloud or by a lamp being switched on.

It is normally only the change in the scene that is of interest while a change in the lighting of the scene should be neglected. This is a problem, as it is very difficult to distinguish between a change in the scene and a change in the lighting.

U.S. Pat. No. 5,956,424 and U.S. Pat. No. 5,937,092 describe a method in video monitoring in which an attempt is made to separate the changes in the lighting from the changes in the scene. This is carried out by attempting to model the intensity of the light that radiates from the surfaces in the scene, in order to filter out changes in the lighting from changes of the actual scene.

In the method according to U.S. Pat. No. 5,956,424 and U.S. Pat. No. 5,937,092, it is assumed that the intensity that radiates from a surface $I_{out}$ is directly proportional to the incident intensity $I_{in}$, that is $I_{out}=r*I_{in}$, where r is the reflectance of a surface. If a change in the lighting occurs, it is assumed that this is linearly proportional, that is $I_{out\ after\ change\ in\ the\ light}=k*I_{out\ before\ change\ in\ the\ light}=k*r*I_{in\ before\ change\ in\ the\ light}$, where k is a change in the light factor or irradiance.

The method according to U.S. Pat. No. 5,956,424 is based on calculating quotients between grayscale values of adjacent pixels, also called picture elements. Picture elements or pixels can be said to be another name for elements in the matrix that represents the digital image. The quotient is a measure that only depends on the reflectance r of a surface and is independent on the irradiance k. A new image is created, the different element values of which only reflect the reflectance in the associated pixel, and then this image is compared with a reference image in which the reflectance of each pixel is calculated under the assumption that the changes in the lighting are proportionally linear. If the change in the lighting is the same in the whole image, the curve will look the same for all pixels. The inclination of the curve represents the reflectance. The quotient between two adjacent pixels may be calculated pixel by pixel, assuming that the lighting of the scene is the same for adjacent areas, that is $I_{in}(x+1, y)=I_{in}(x,y)$ by equation:

$$\frac{I_{out,after}(x+1, y)}{I_{out,after}(x, y)} = \frac{kI_{out,before}(x+1, y)}{kI_{out,before}(x, y)} = \frac{r_{(x+1,y)}kI_{in}(x+1, y)}{r_{(x,y)}kI_{in}(x, y)} = \frac{r_{(x+1,y)}}{r_{(x,y)}}$$

The quotient is thus independent of k. Thus, a change in the lighting can be discriminated from a change in the scene, since at a change of the lighting, the ratio between adjacent pixels in the present image and the ratio of the same adjacent pixels in the reference image is constant and independent of a change in the irradiance.

Proportionally linear changes in the intensities that this model represents occur when the light is reflected against a Lambertian surface. This is a matt surface, which when it is illuminated, radiates equally in all directions and does not give rise to any reflection. With this modeling and this method, the probability is increased of a detected change being due to a change in the scene. However, many changes in the lighting are still detected as changes in the scene, which can cause costly false alarms. If the light intensity is measured, in reality a curve is obtained, which is not a proportionally linear curve.

The fact that the curve is not proportionally linear is due primarily to the fact that the sensor does not depict the incident intensities proportionally linearly in grayscale values, but as an affine function. This is partially due to the fact that certain surfaces in an area monitored by the sensor do not fulfill the requirement of being a Lambertian surface. By an affine representation is meant that $I_{after}=aI_{before}+b$.

Another problem with the method according to U.S. Pat. No. 5,956,424 is that the calculation of the quotient between the intensities of adjacent pixels means that the system is more sensitive to noise. The sensitivity to noise arises, for example, in very dark areas in the image, or at edges where one side is dark and the other is light. Assume that the quotient is calculated between two pixels where the intensities in the reference image are 5 and 20 respectively, that is the quotient is 20/5=4. If the current image of the monitored area is recorded by a sensor that contains noise in each pixel of a maximum of 2 intensity levels, this quotient can vary between 22/3=7.3 and 18/7=2.4, which can be compared with the reference image's quotient of 4 (+83% to −40%).

Another known technique for attempting to solve the problem of changes in the lighting being detected as changes in the scene is a technique called NVD "Normalized Vector Distance" described in Matsuyama, Ohya, Habe: "Background subtraction for non-stationary scene", Proceedings of the fourth Asian conference on computer vision 2000, pp 662–667. In this article there is an attempt, precisely as above, to solve the problem of changes in the lighting in the image by modeling them as proportionally linear changes in the intensities, $I_{out,after}=kI_{in}$ where k is a change in the lighting factor. In NVD the image is divided into blocks. The size of the blocks can be chosen according to the application. For example, the blocks can be 2 pixels in size. The first block can have the value (30,30) and the second block (50,50). These vectors have the same direction and it is therefore decided that the change is due to a change in the lighting. If the direction differs over a particular threshold limit, it is decided that the change is a change in the scene. By considering angles between vectors defined on the basis of intensities, forming the elements of the vectors, in partial areas, a measure is obtained that is invariant for proportionally linear changes in the intensities. By invariant is meant in this connection that the angle between the vectors of the reference image and the current image is the same, irrespective of proportionally linear transformations of grayscale values in the current image.

Using NVD, there are the same disadvantages as mentioned above, which lead to a change in the lighting being able to be interpreted as a change in the scene. The problems with noise in dark areas also still remain, as a vector is defined with components consisting of the intensities in a square that comprises a number of pixels and then this is normalized. If the vector, for example, consists of a 4-dimensional vector with small components, for example (2,5,4,4) and the reference images contain noise with a maximum of 2 intensity levels, the direction of this vector can vary considerably, which may result in false alarms.

SUMMARY OF THE INVENTION

An object of the present invention is thus to provide a method of image processing that can detect changes in the scene with greater reliability. More specifically, the method can discriminate between changes caused by lighting conditions and changes caused by scene conditions.

According to a first aspect of the present invention, this comprises a method in image processing for detection of a change in the scene in an area, comprising the steps of recording a digital image of the area with a sensor, transforming the recorded image by an operator that is based on a previous modeling of changes in the lighting in the area and on a modeling of how the sensor depicts the area in grayscale values in the recorded image, and comparing the transformed image with a reference image of the area in order to detect a difference that indicates a change in the scene.

The invention is based on an analysis of changes in the lighting that shows that changes in the intensities in the images do not only depend upon changes in the lighting of the scene and upon the reflective properties of the surfaces, but also upon how the sensor depicts intensities of grayscale values. By modeling for these changes in the lighting, the number of false alarms is reduced, as these changes in the lighting are not removed by transformation during the comparison between the transformed recorded image and the reference image. False alarms are costly and with a reduction in the number of false alarms, the cost of the system that uses this method is also reduced. A further advantage is that different sensor settings can be made, such as changes in amplification and aperture, without the risk that these will be detected as changes in the scenes in the area.

This method can be used for various types of monitoring, such as monitoring for intruders. The method can also be used with manufacturing processes for inspecting various components in order to detect defects in the manufactured product.

In another embodiment, the reference image is also transformed by said operator.

The transformed image is compared with a reference image that has been transformed according to the same method. An advantage of this method is that the transformed reference image and the transformed recorded image will differ in the event of a change in the scene, but are the same for changes in lighting intensity for which the operator is modeled. In this way, the number of false alarms is reduced.

In a further embodiment, the operator is invariant with regard to transformations of said grayscale values in the recorded image.

The advantage of the operator being invariant, is that the transformed image is the same even if there is a change in the grayscale values arising from a change in lighting, such as that for which the operator is modeled. This means that when the transformed recorded image is compared with a reference image transformed in the same way, the differences that are detected will indicate changes in the scene and not the above-mentioned changes in grayscale values resulting from a change in the lighting of the scene.

In a still further embodiment, the operator is an affine invariant.

This embodiment is based on the idea of transforming the image and calculating an affine invariant measure that is constant over affine changes in intensity. The advantage of using affine functions is that a measure is obtained that is unchanged by affine changes in intensity, but is changed by a change in the scene. The operator is invariant for affine transformations.

If it is not taken into account that the grayscale values that are recorded in the digital image are due both to the incident intensity and to how the sensor converts these intensities into grayscale values, image information can be lost that may be important for the continued image processing. The sensor can have range 0–255, which is a measurement range within which the sensor is set to record intensities and to convert these to numbers between 0 and 255. Intensities that are outside the measurement range are converted to either number 0 or 255. After a change in incident light intensity, the measurement range can be displaced and information can be lost. In order to prevent this, the measurement range can be moved. There are known algorithms for this movement of the measurement range. If only quotients are used that take into account linearly proportional changes in the intensities, this movement affects the transformed image. If, on the other hand, the affine invariant measure is used, the movement of the measurement range does not affect the transformed image. The invention models both how the lighting affects the light emitted from a Lambertian surface and how the sensor depicts the incident intensity.

With a proportionally linear transformation it may not be possible to capture in a reliable way the variations in the intensity that arise, as these occur within a limited grayscale range. By instead using an affine transformation and by moving the measurement range, as in our invention, the variations that arise in a particular range can be captured more accurately. The appearance of this affine transformation, that is where it ends up in the coordinate system, depends among other things on the exposure time and aperture of the sensor. The settings of the sensor change the position of the grayscale range. An advantage of our invention is thus that a change in the measurement range does not give rise to a change in the scene.

Another advantage of the invention is that it takes into account affine changes in intensity and can thus also handle different settings in the sensor, such as exposure and aperture. This has the result that the number of false alarms is reduced. This also reduces the cost of monitoring.

An additional advantage is that the invention can also handle changes in intensity in surfaces that radiate the same amount all the time, that is self-radiating surfaces, such as a lamp. In addition, the invention can also handle surfaces that are intermediate between self-radiating surfaces and Lambertian surfaces as well as reflecting surfaces. Of course, the invention can also handle Larnbertian surfaces.

The change in the lighting can be modeled as $$I_{after\ change\ in\ the\ light} = c*k*I_{before\ change\ in\ the\ light} + b$$

where c is a constant that depends on the sensor and on the reflectance and b is a constant that depends on the sensor. Below, the designation a=c*k is used. The advantage of this modeling is that it also takes into account the settings of the sensor. By modeling in this way, it is taken account of light change functions $I_{after}=aI_{before}+b$ in which a=1, that is a function according to equation $I_{after}=I_{before}+b$. This is particularly useful in the cases when b is large, which may occur for certain settings of the sensor.

An additional advantage is that proportionally linear changes in the lighting can also be handled, that is $I_{after}=aI_{before}+b$, with b=0, which gives $I_{after}=aI_{before}$. This is useful in the cases when b is small, which can occur for certain changes in the lighting.

In another embodiment of the method according to the invention, the step of transforming comprises the steps of filtering the recorded image with a first filter, filtering the recorded image with a second filter, the first and the second filter differing from each other and both having the coefficient sum zero, and determining the quotient between the filtered images.

The advantage of using filters is that it reduces the sensitivity to noise. The recorded image is filtered before the quotients between the different pixels are calculated, in order to reduce the sensitivity to noise. The quotient between the images is carried out pixel by pixel.

The affine invariant measure can thus be written as $$m_I = \frac{F_1 * I}{F_2 * I}$$

where $F_1$ and $F_2$ denote different filters with the coefficient sum zero, * denotes convolution and I=I (x,y) denotes the intensities in the image. From this formula, it can be seen that affine transformations of the intensities in the images do not affect the measure $m_I$ $$m_I = \frac{F_1 * I_e}{F_2 * I_e} = \frac{F_1 * (aI_f + b)}{F_2 * (aI_f + b)} = \frac{aF_1 * I_f + F_1 * b}{aF_2 * I_f + F_2 * b} = \frac{F_1 * I_f}{F_2 * I_f}$$

where $I_e$ is the intensity after the change in the lighting and $I_f$ is the intensity before the change in the lighting. The last quotient is obtained as $F_1*b=F_2*b=0$, which is due to the fact that the coefficient sum for $F_1$ and $F_2$ is zero.

In the special case mentioned above, where $I_{after}=aI_{before}+b$ and a=1, that is a function according to equation $I_{after}=I_{before}+b$, it is sufficient to use the approximate invariant $$m_I(x,y)=F*I$$

where F denotes an arbitrary filter with the coefficient sum 0.

In the case where $I_{after}=aI_{before}+b$, with b=0, which gives $I_{after}=aI_{before}$, it is sufficient to use the approximate invariant $$m_I = \frac{F_1 * I}{F_2 * I}$$

where $F_1$ and $F_2$ denote arbitrary filters, since $$m_I = \frac{F_1 * I_e}{F_2 * I_e} = \frac{F_1 * (aI_f)}{F_2 * (aI_f)} = \frac{aF_1 * I_f}{aF_2 * I_f} = \frac{F_1 * I_f}{F_2 * I_f}$$

In one embodiment, the first and the second filter are a derivative of the Gaussian function.

The advantage of the Gaussian function is that it is simple to implement and that it is based on well-documented Scale Space theory, which means that the smoothing and the noise reduction is optimal.

In an additional embodiment according to the invention, the first filter is a derivative of the Gaussian function in the x-direction and the second filter is a derivative of the same Gaussian function in the y-direction.

The Gaussian function of the same scale is advantageously used as this results in a simpler implementation.

In one embodiment according to the invention, the first and the second filter are two simple difference filters between the intensity in one pixel and the intensity in another pixel.

The advantage of this embodiment is that it is very simple to implement and also very fast.

In another embodiment according to the invention, the first filter is a difference filter between two pixels horizontally adjacent to each other and the second filter is a difference filter between two pixels vertically adjacent to each other.

Both filters are thus difference filters between adjacent pixels in two orthogonal directions. Advantageously, a pixel from the difference in the vertical direction agrees with a pixel from the difference in the horizontal direction.

In another embodiment according to the invention, the operator is a modification of normalized vector distance, in which the step of transforming comprises the steps of calculating the mean value of the intensity in a subset of the recorded image, subtracting the mean value in each pixel and carrying out a normalized vector distance calculation.

The advantage of this modified NVD is that, unlike the standard NVD, it takes into account affine changes in the intensities.

In still another embodiment according to the invention, the step of comparing comprises the step of calculating the difference between respective vectors in the transformed recorded image and the transformed reference image.

The difference can be calculated by calculating the angle between the vectors or the distance between the vectors.

A predetermined threshold value can be set. If the distance exceeds this level, it can be decided that there has been a change in the scene. Alternatively, it can be said that it is the angle between the vectors that is compared with the threshold value. If the angle is essentially zero, no change in the scene is said to have occurred and if the angle exceeds a predetermined value it can be decided that there has been a change in the scene.

In an embodiment according to the invention, the method comprises the step of adapting at least two parameters to the operator.

In certain situations, problems can arise when two filtered images are divided by each other. For example, when the intensity is constant in an area, which implies that corresponding elements in the filtered image will be near zero. This can be avoided by adapting coefficients instead of comparing the quotient of filtered images. The coefficients can be calculated by solving a least square problem.

An advantage of this embodiment is that it is less sensitive to noise in certain situations. An example of such a situation is when a part of the image with great variation in intensity changes into an area of almost constant intensity, for example when a lamp is switched off.

In another embodiment, said parameters are adapted in such a way that they cover all transformations of said grayscale values arising for changes of the lighting of the scene.

In this way, changes in intensity that arise as a result of changes in the lighting or as a result of how the sensor depicts changes in intensity will not be detected as changes in the scene and will therefore not give rise to false alarms.

In still another embodiment according to the invention, the operator is an affine transformation.

In an additional embodiment according to the present invention, the parameters are adapted locally in the recorded image.

The fact that the adaptation is carried out locally means that the recorded image is divided into different parts and the adaptation of parameters is carried out in each part of the image. The adaptation of parameters can be carried out by adapting the recorded image to the reference image, in accordance with the following $$aI_{recorded\ image} + b = I_{reference\ image}.$$

An advantage of this embodiment is that local changes in the lighting that only occur in a small part of the area can be handled better. The local adapting can be regarded as if the method for adapting parameters described above was applied to a part of the image.

Another embodiment according to the invention comprises in addition the step of filtering both the recorded image and the reference image with a smoothing filter.

The advantage of filtering is that the sensitivity to noise is reduced. A smoothing filter is a filter that creates a weighted mean value of the intensities locally, that is in a part of the image. The creation of the weighted mean value means that the variance of the noise in the filtered image is less than in the original image.

In one embodiment, the smoothing filter is a Gaussian function.

Different breadths for the Gaussian function may be chosen, and in this way different levels of smoothing can be obtained.

According to a third aspect of the invention, this comprises a computer program that is stored on a computer-readable memory medium that comprises instructions for causing a computer to carry out the method according to any one of claims 1–14.

According to a fourth aspect of the invention, this comprises the use of an operator in image processing for detection of a change in the scene in an image of an area recorded by a sensor, which operator is based on a previous modeling of changes in the lighting in the area and on a modeling of how the sensor depicts the area in grayscale values in the recorded image.

According to a fifth aspect of the invention, this comprises a system for monitoring an area comprising at least one sensor for recording images of the area and at least one processing unit in which the computer program according to claim 13 is stored.

The advantages of these aspects of the invention are apparent from the discussions above.

In a seventh aspect of the invention, the method can be used with an automatic door-opener.

The method is particularly advantageous for use in an automatic door-opener. A sensor unit can be arranged to continually record images of a monitored area in front of a door. The door can, for example, be a revolving door or a sliding door. A processing unit can be arranged to carry out the above-mentioned method. If a person moves into the monitored area in front of the door, the person is detected as an object and a decision can be taken concerning whether the detected object is to cause the door to open. The image processing that is used as the basis for the decision concerning the opening of the door can have different degrees of intelligence level. This means that the image processing can be very simple and the decision that the door is to be opened can be made for all objects that cause movement to be detected. It can also be very advanced and only cause the door to open in the event that the detected object has, for example, a particular shape, size or direction of movement. If it is decided that the door is to be opened, a signal that the door is to be opened can be transmitted to a door-opening device, that physically opens the door.

Automatic door-openers are, for example, very common at the main entrances to various companies. Just inside the door there is usually a manned reception area. If the door is opened frequently, this affects the temperature inside the reception area, with resultant often costly heat losses. In addition, the people working there are exposed to draughts and cold air. It is therefore important that the door is not opened in error. By the use of the above-mentioned method, the risk is reduced of the door being opened in error, in, for example, difficult weather conditions, such as snow and rain, and different lighting and shade conditions that can arise when, for example, the sun goes behind a cloud. The automatic door-opener is also reliable when the monitored area is dark, as with the method above it is able more effectively to identify persons moving in the monitored area and can thus decide in a reliable way whether the door is to open.

BRIEF DESCRIPTION OF THE DRAWINGS

Further objects, features and advantages of the invention will appear from the detailed description given below with reference to the accompanying drawings, in which.

DESCRIPTION OF THE EMBODIMENTS OF THE INVENTION

The invention will next be described first in abstract mathematical language and thereafter by means of a number of embodiments.

Figure 1:
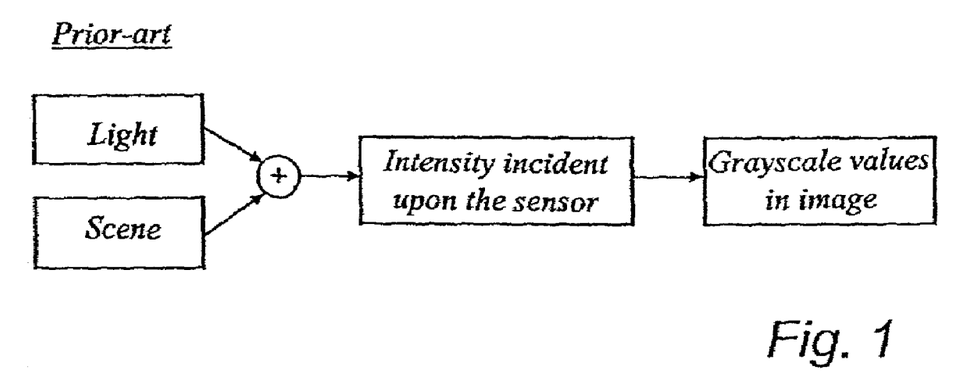
FIG. 1 is a block diagram and shows schematically assumed sources of changes in intensity according to prior-art technique.
Figure 2:
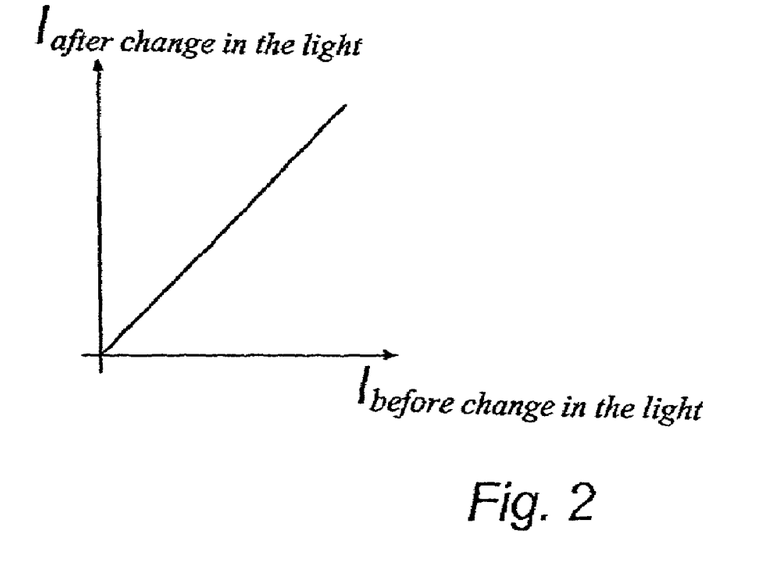
FIG. 2 is a diagram and shows schematically according to prior-art technique that the changes in the intensities are linearly proportional.
Figure 3:
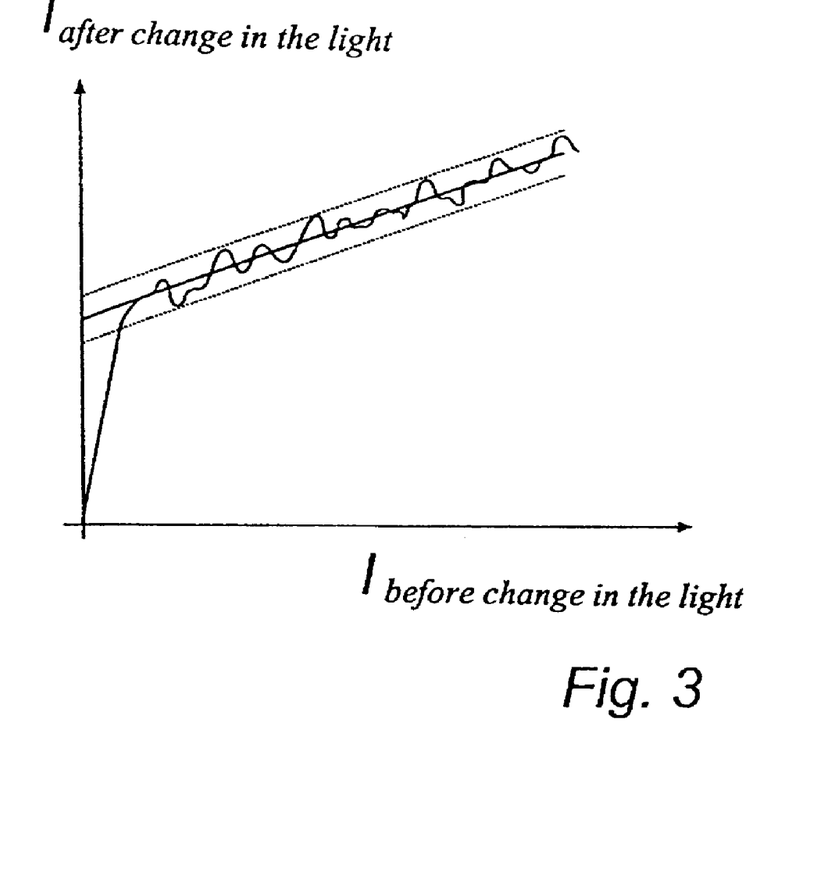
FIG. 3 is a diagram in which by way of experiment the intensities have been recorded before and after a change in the lighting of the scene.
Figure 4:
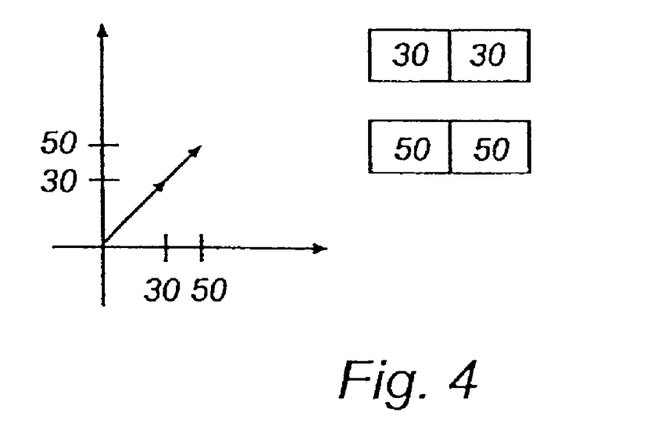
FIG. 4 is a schematic diagram and shows vectors according to NVD.
Figure 5:
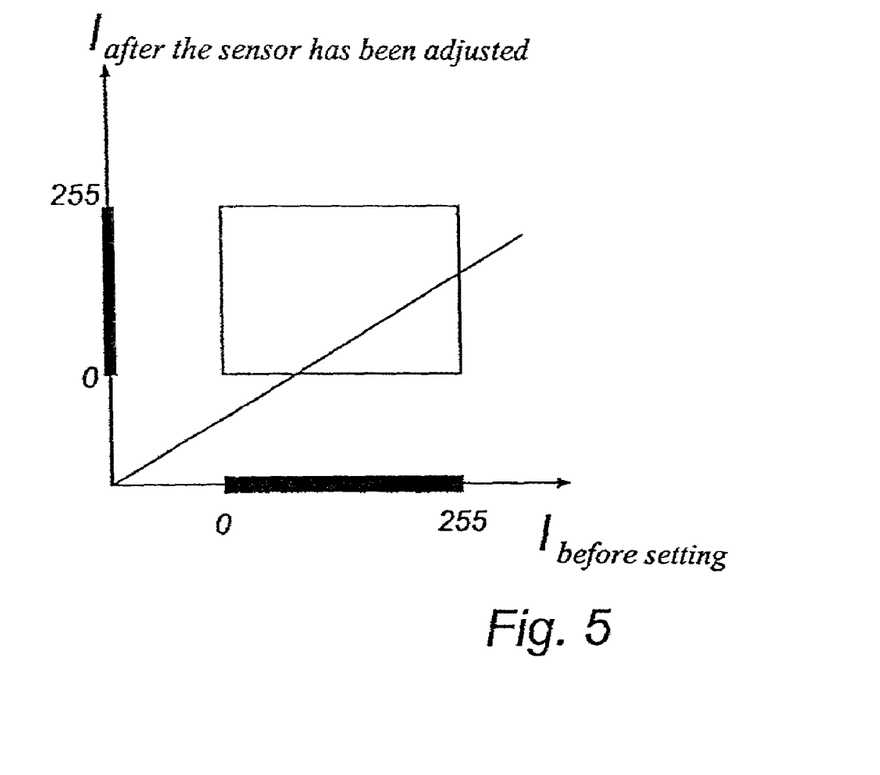
FIG. 5 is a diagram and shows schematically a modeling of the sensor.

FIG. 1 in the present application shows, according to prior-art technique, that the intensity incident upon the sensor is dependent upon the scene and the light that falls on the scene. Thus both the incident light and the scene give rise to the intensity incident upon the sensor. The incident intensity is recorded as grayscale values in the sensor.

MATHEMATICAL DESCRIPTION OF THE INVENTION

The basic idea of the present invention may be formulated in abstract mathematical language.

In order to model the physical reality and how the sensor records the physical world, operators are used.

The operators that we want to find are functions, F, that depict a digital image in some other space, that is $$F: V \ni B \mapsto B' \in V'$$

Here V denotes the space of digital images ($Z^{n \times m}$, where Z denotes the number of integers—normally integers between 0 and 255—, n denotes the number of rows and m the number of columns), B is an element in V (that is a digital image), V' is some other (linear) space and B' is an element in V'. Normally V' also consists of digital images of some size, but also a more general space can be used, for example vector-based images.

The transformation of the images in V that we want to "filter" out can be regarded as some group action over V. Introduce the notation G for this group:

$$g \in G: V \ni B \mapsto g(B) \in V$$

where an element g in the group G transforms one image B into another image g(B) (in the same space). For example, the group can be the one-dimensional affine group, parameterized by two parameters, a and b, according to $$g(a,b) \in G: V \ni I(x,y) \mapsto aI(x,y) + b \in V$$

where I(x,y) denotes the intensity in position (x,y).

The operators, F, that we are seeking are those that are invariant for the group action with the group G, which means that $$F(B) = F(g(B)), \forall g \in G$$

For the affine group, this means that the image B is depicted on the same element in V' as the image g(B), that is we get the same element in V' irrespective of affine transformations of the intensity.

We can drive the formalism a step further by considering: a generalized measure (metric) of the space V'

$$d(B'_1, B'_2): V' \times V' \ni (B'_1, B'_2) \mapsto d(B'_1, B'_2) \in W$$

where W denotes the space of digital images of the same size as the images in V, but with real intensities. The metric measures distances in the space V' and relates these to the original image where we can read off changes in the image that do not originate from the group action.

What we have now done can be described as if we are considering the equivalence classes in V that arise from the group action from G and then introducing a distance measure of these equivalence classes.

Application in a Monitoring System

Figure 9:
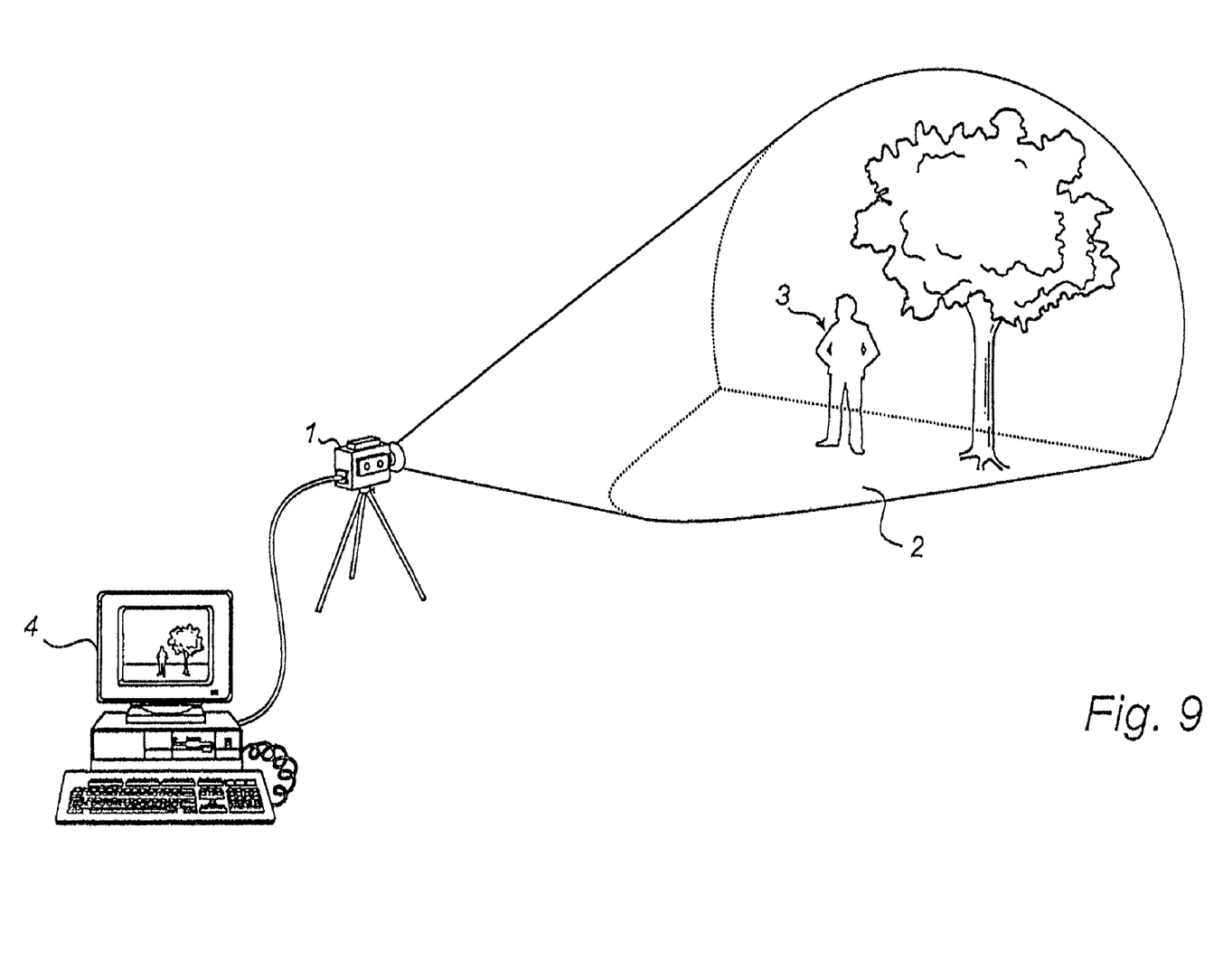
FIG. 9 is a partially schematic perspective view and shows a monitoring system according to the present invention.

Using a number of embodiments, it will now be described how the mathematical description above can be applied in practice for image processing in a monitoring system, as shown in FIG. 9. The monitoring system comprises at least one light-sensitive sensor unit 1 that monitors a monitored area 2. The monitored area can be an area in which no object, such as a person should be found. The sensor unit 1 continually records digital images of the monitored area 2 in order to detect whether, for example, a person 3 is within the monitored area 2. A digital image can be said to be a matrix in which elements at the position (i,j) tell what light intensity has been detected at that point. If a person 3 is detected within the monitored area 2, the sensor unit can output an alarm signal, that is sent to an alarm center 4. The alarm signal, that is sent to the alarm center 4, y can consist of only a signal that a movement has been detected, but it can also comprise a recorded image or an image of only the moving object that caused the alarm. This image can be displayed on a screen in the alarm center 4 and a person in the alarm center 4 can then carry out a further check on what caused the alarm. In a very simple case, the alarm center 4 can be a device that emits a sound signal when it receives an alarm signal from the sensor unit 1.

Figure 10:
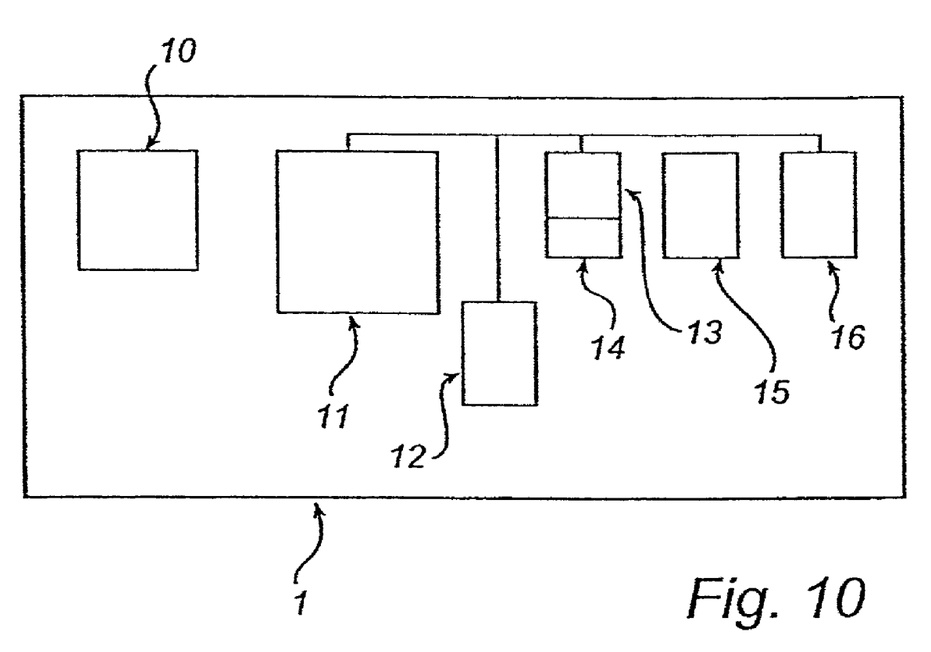
FIG. 10 is a schematic block diagram for hardware in a sensor unit according to one embodiment.

FIG. 10 discloses a block diagram of the hardware in the sensor unit 1. The sensor unit 1 is supplied with a voltage at a voltage connection 10. In addition, the sensor unit 1 comprises a powerful processing unit 11. The sensor unit 1 comprises a communication unit 12. The communication unit can be arranged to send an alarm signal to the alarm center 4 in the event of detection of a movement. In addition, the sensor unit 1 comprises a light-sensitive sensor 13, for example a CMOS or CCD sensor, for recording images. The sensor 13 is integrated on a chip and it has also a lens arrangement 14. In addition, the sensor unit 1 comprises a volatile memory or RAM memory 15. The sensor unit 1 uses an operating system and can carry out advanced image processing. The sensor unit 1 also comprises a permanent memory 16 for processing code and other data that must be saved in a non-volatile memory. All the components in the sensor unit 1 are advantageously integrated on a circuit board. The advantage of this is that the sensor unit 1 is very robust, that is to say that it is less sensitive to sources of interference and has fewer points where sabotage can be carried out.

The algorithms that are used are stored in the permanent memory 16.

Filtering

Figure 7:
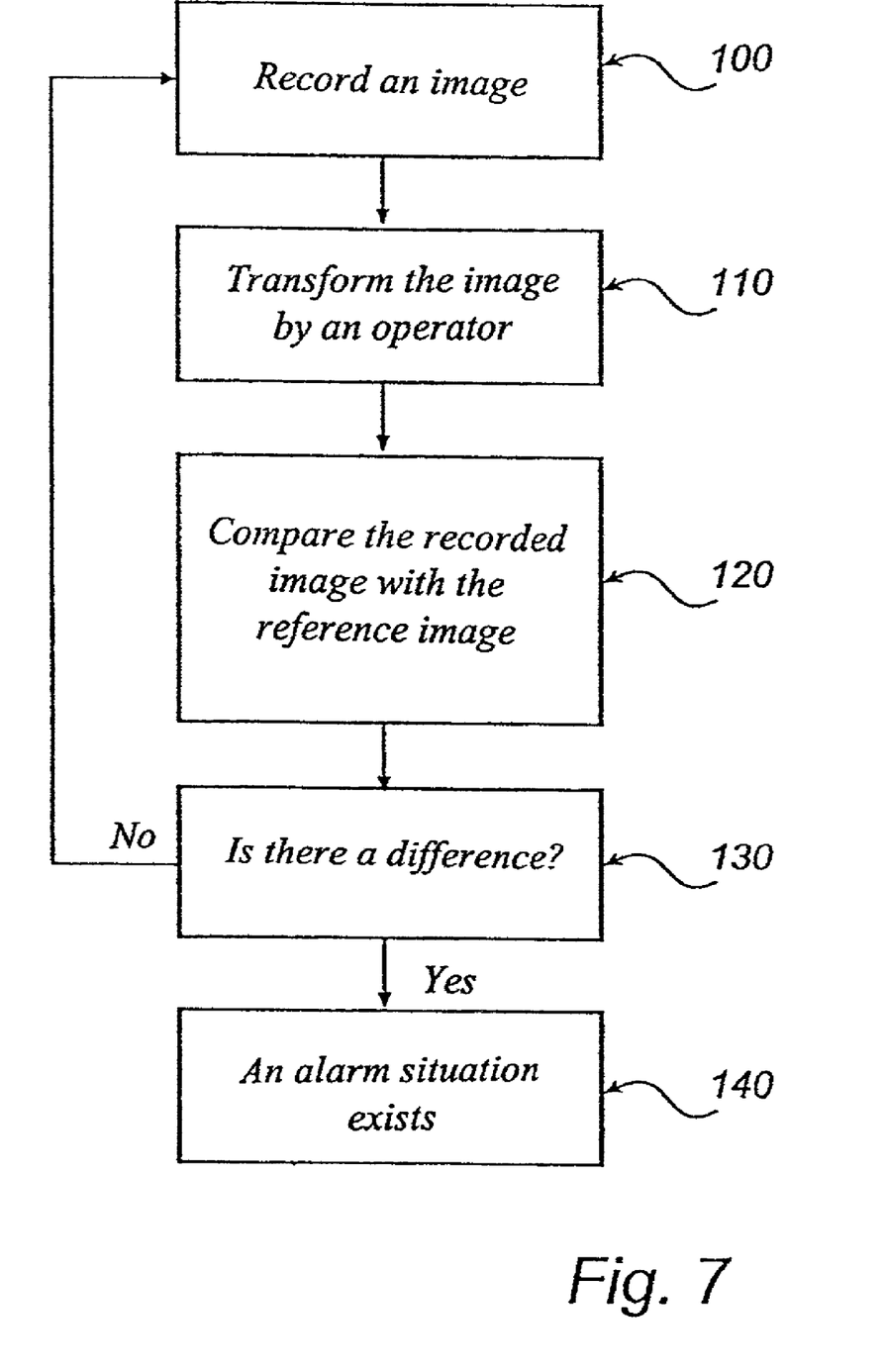
FIG. 7 is a schematic flow diagram of an embodiment according to the present invention.
Figure 8:
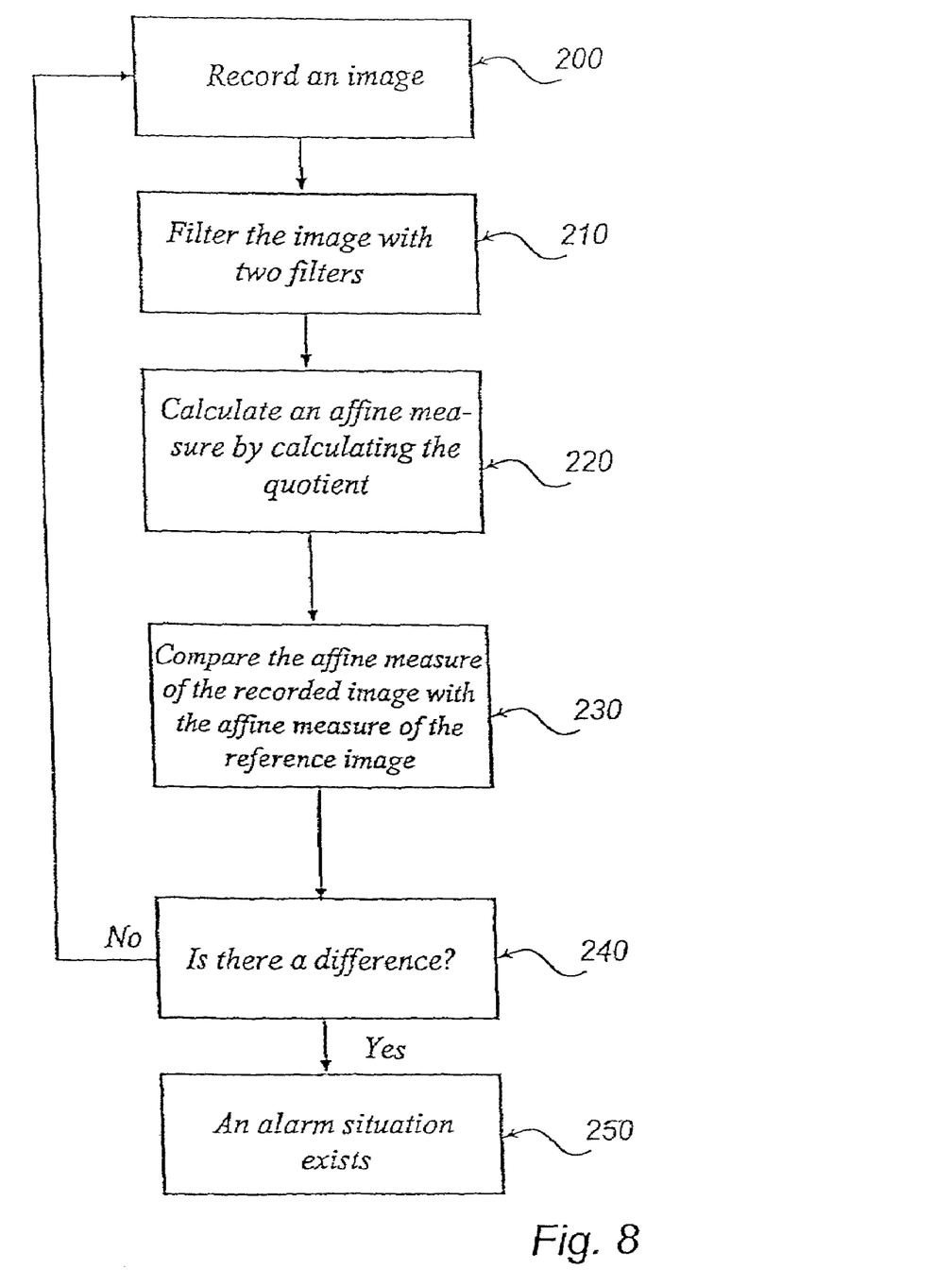
FIG. 8 is a schematic flow diagram of another embodiment according to the present invention.

A first embodiment will now be explained with reference to the flow diagrams in FIGS. 7 and 8. The sensor 13 records 100, 200 an image of the monitored area 2. The image is transformed by an affine invariant measure being calculated. The affine invariant measure is the same for all affine changes in the lighting and all sensor settings. It is calculated by the following method.

The recorded image is filtered 210 with two arbitrary linear filters $F_1(x,y)$ and $F_2(x,y)$ with the property that $$\sum_{x,y} F_i(x, y) = 0, i = 1, 2$$

The filtering is carried out in order to reduce the sensitivity to noise. For example, the derivative of the Gaussian function, $G_a$, can be used as filter $$G_a(x, y) = \frac{1}{2\pi a} e^{-(x^2+y^2)/2a^2}$$

where a denotes the breadth (the scale). Thus, a filter may be, for example $$F_1(x, y) = \frac{\partial}{\partial x} \frac{1}{2\pi a} e^{-(x^2+y^2)/2a^2}$$
$$F_2(x, y) = \frac{\partial}{\partial y} \frac{1}{2\pi a} e^{-(x^2+y^2)/2a^2}$$

The filtering can be carried out in a number of different ways. For example, we can also use derivatives in the same direction, but with different scales (a).

After the filtering, an affine measure is calculated 110, 220 in accordance with the following $$m_I = \frac{F_1 * I_e}{F_2 * I_e} = \frac{F_1 * (aI_f + b)}{F_2 * (aI_f + b)} = \frac{aF_1 * I_f + F_1 b}{aF_2 * I_f + F_2 b} = \frac{F_1 * I_f}{F_2 * I_f}$$

since $F_1*b = F_2*b = 0$, which is due to the fact that the coefficient sum for $F_1$ and $F_2$ is zero. Given the properties of the filters, the measure will be independent of the constants a and b.

The image is filtered before the quotients between different pixels are calculated, in order to reduce the sensitivity to noise.

The reference image has been processed in the same way as the recorded image, that is it has been filtered using the same linear filter as the recorded image and the affine invariant measure has been calculated. The affine invariant measure of the recorded processed image is compared 120, 230 with the affine invariant measure of the reference image. If a difference is detected 130, 240, this is said to originate from a change in the scene and it is decided that an alarm situation exists 140, 250.

In the formalism of the mathematical description, this embodiment corresponds to the operator F depicting the image B on a quotient of filtered images B', which is also an image, but with real numbers as elements.

Special Case of Filtering

Another embodiment can be regarded as a special case of filtering as above. The filter that is used can be of various types. The filter is a linear position-invariant operator that is represented by a matrix and operates on the digital image. In one example, the filter is a difference between adjacent pixels. In this embodiment, an affine invariant is calculated from the intensities in three adjacent pixels, $I_1$, $I_2$ and $I_3$. This can, for example, be calculated in accordance with the following:

$$m_{(I_1, I_2, I_3)} = \frac{I_3 - I_1}{I_2 - I_1}$$

In particular, the pixel to the right and the pixel below can be used, which gives $$m_{(I)}(x, y) = \frac{I(x+1, y) - I(x, y)}{I(x, y+1) - I(x, y)}$$

In this way, we obtain by transformation a "new" image. The same transformation is carried out on the reference image. The affine invariant measure of the recorded image is compared with the affine invariant measure of the reference image. If there is a difference between the two images, a change in the scene is said to have taken place.

Figure 6:
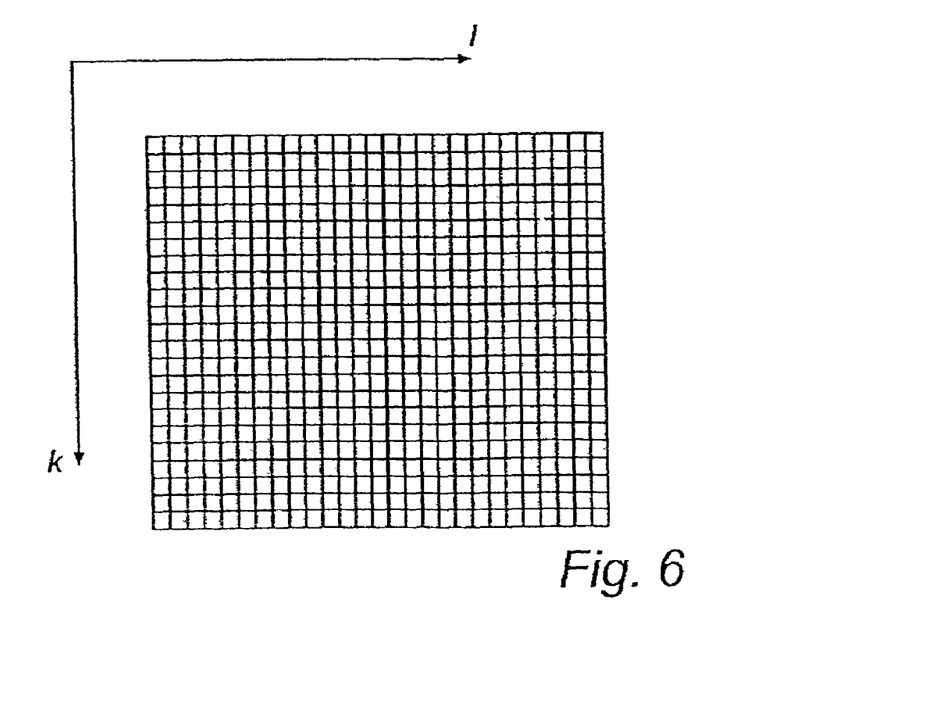
FIG. 6 is a diagram which shows schematically the location of the coordinate system in an image for description of a filter.

There are many types of filter that can be used $$F * I = \sum_{k,l} f(k, t) I(i-k, j-1);$$

where the axes are in accordance with FIG. 6. Which filter is used, depends on what requirements are imposed relating to the sensitivity to noise and what processing power is available. The larger the filter, the more complex the calculations that are required, but on the other hand, a more robust system is obtained that is not so sensitive to interference.

Modified NVD

In another embodiment, a modified NVD (Normalized Vector Distance) is used. The sensor records an image of the monitored area. The image is divided into a number of squares. Each square contains a number of pixels, which can, for example, be 8×8 pixels. A mean value of the intensity in each of the squares is calculated. This mean value is then subtracted from each pixel in the respective square. Following this, vectors are calculated based on the intensities of the squares. These vectors are normalized. The vectors are affine invariant measures. The vectors in the transformed recorded image are compared with the vectors in the reference image transformed in the same way. By considering the angles between the vectors in the recorded image and the reference image, a measure is obtained that is invariant for affine changes in the intensities.

If the distance between the vectors is zero, there has been no change in the scene, that is if the angle between the vectors is zero, there has been no change in the scene. A threshold value is often set that means that the angular difference must be a particular minimum size in order for it to be determined that there has been a change in the scene. This is because there is often a certain amount of noise in the image.

In the formalism above, this modification of NVD can be obtained by letting the space V' denote vector-value images with a lower resolution than the original image. Each matrix element in the image B' in V' is then a vector. The generalized measure is then the normalized distance between the vectors related to the original image.

Adapting Coefficients

In certain situations, problems can arise when two filtered images are divided by each other. For example, when the intensity is constant in an area, which implies that corresponding elements in the filtered image will be near zero. This can be avoided by matching coefficients a and b so that a*Ir(x,y)+b is as near to the recorded image as possible, where Ir denotes the reference image, instead of comparing the quotient of filtered images. The coefficients are most suitably calculated by solving the least square problem $$\min_{a,b} \sum_{(x,y)\in\Omega} (aI_{ref}(x,y)+b-I)^2$$

where $\Omega$ denotes a suitable subset in the image. This least square problem is very simple to solve by writing down the standard equations and inverting a 2×2 matrix. Let x denote a vector that contains all intensities within $\Omega$ for the reference image ordered in some suitable way and let y denote corresponding intensities for the current image. The standard equations can now be written as $$y_i = ax_i + b, \quad i=1, \ldots, n,$$

where n denotes the number of pixels in the area $\Omega$. In matrix form, the above can be written as $$y = ax + b = \begin{bmatrix} a & b \end{bmatrix} \begin{bmatrix} x \\ 1 \end{bmatrix}.$$

If we now multiply by the transposition of the last vector on both sides, we get $$y[x^T \ 1] = [a \ b] \begin{bmatrix} x \\ 1 \end{bmatrix} [x^T \ 1] = [a \ b] \begin{bmatrix} xx^T & x \\ x^T & 1 \end{bmatrix}$$

which in turn gives $$[a \ b] = y[x^T \ 1] = \begin{bmatrix} xx^T & x \\ x^T & 1 \end{bmatrix}^{-1}.$$

In the next step, these parameters a and b are used to transform the reference image into a new image by defining Irnew=a*Ir+b. Irnew is then used as comparison with the current image. For example, the difference image can be considered and then this can be thresholded in order to detect changes in the scene.

The above method can advantageously be modified by filtering both the reference image and the current image with any smoothing filter before the parameters a and b are calculated. This method means that the sensitivity to noise is reduced and it is particularly preferable to use a Gaussian filter.

In the same way, the modification of NVD can be handled by adapting coefficients a and b for each block instead of calculating the normalized distance. A threshold value is set, such that if the above minimizing exceeds this value it is determined that there has been a change in the scene. New constants a and b must be calculated for each new image that is recorded by the sensor.

Even though several embodiments of the invention have been described above, it is obvious to those skilled in the art that many alternatives, modifications and variations are feasible in the light of the above description. The invention is only limited by the appended patent claims.

I claim:

1. A method in image processing for detection of a change in a scene in an area, comprising the steps of
  recording a digital image of the area using a sensor,
  transforming the recorded image by an operator that is based on a previous modeling of changes in the lighting in the area and on a modeling of how the sensor depicts the area in grayscale values in the recorded image, and
  comparing the transformed image with a reference image of the area in order to detect a difference that indicates a change in the scene,
  wherein the operator is an affine invariant and
  the step of transforming comprises the steps of filtering the recorded image with a first filter, filtering the recorded image with a second filter, the first and the second filter differing from each other and both having the coefficient sum zero, and determining the quotient between the filtered images.

2. A method according to claim 1, in which the reference image is transformed by said operator.

3. A method according to claim 1, in which the operator is invariant with regard to transformations of said grayscale values in the recorded image.

4. A method according to claim 1, in which the first and the second filter are a derivative of the Gaussian function.

5. A method according to claim 4, in which the first filter is a derivative of the Gaussian function in the x-direction and the second filter is a derivative of the same Gaussian function in the y-direction.

6. A method according to claim 1, in which the first and the second filter are two simple difference filters between the grayscale value in one pixel and the grayscale value in another pixel.

7. A method according to claim 6, in which the first filter is a difference filter between two pixels horizontally adjacent to each other and the second filter is a difference filter between two pixels vertically adjacent to each other.

8. A method in image processing for detection of a change in a scene in an area, comprising the steps of
recording a digital image of the area using a sensor,
transforming the recorded image by an operator that is based on a previous modeling of changes in the lighting in the area and on a modeling of how the sensor depicts the area in grayscale values in the recorded image, and
comparing the transformed image with a reference image of the area in order to detect a difference that indicates a change in the scene,
in which the operator is a modification of normalized vector distance, the step of transforming comprising the steps of calculating the mean value of the grayscale value in a subset of the recorded image, subtracting the mean value in each pixel, and carrying out a normalized vector distance calculation.

9. A method according to claim 8, in which the step of comparing comprises the step of calculating the difference between respective vectors in the transformed recorded image and the transformed reference image.

10. A method according to claim 8, in which the reference image is transformed by said operator.

11. A method according to claim 8, in which the operator is invariant with regard to transformations of said grayscale values in the recorded image.

12. A method according to claim 8, in which the operator is an affine transformation.

13. A computer program that is stored on a computer-readable memory medium that comprises instructions for causing a computer to carry out the method according to any one of claims 1–12.

14. A system for monitoring an area, comprising at least one sensor for recording images of the area, a memory in which the computer program according to claim 13 is stored and a processing unit.

* * * * *